Aug. 4, 1959  S. BECKWITH  2,897,658
METHOD AND APPARATUS FOR UNLOADING COLD LOW TEMPERATURE
BOILING LIQUIDS FROM STORAGE RESERVOIR
Filed March 16, 1955  2 Sheets-Sheet 1

Inventor
Sterling Beckwith
by Parker & Carter
Attorneys

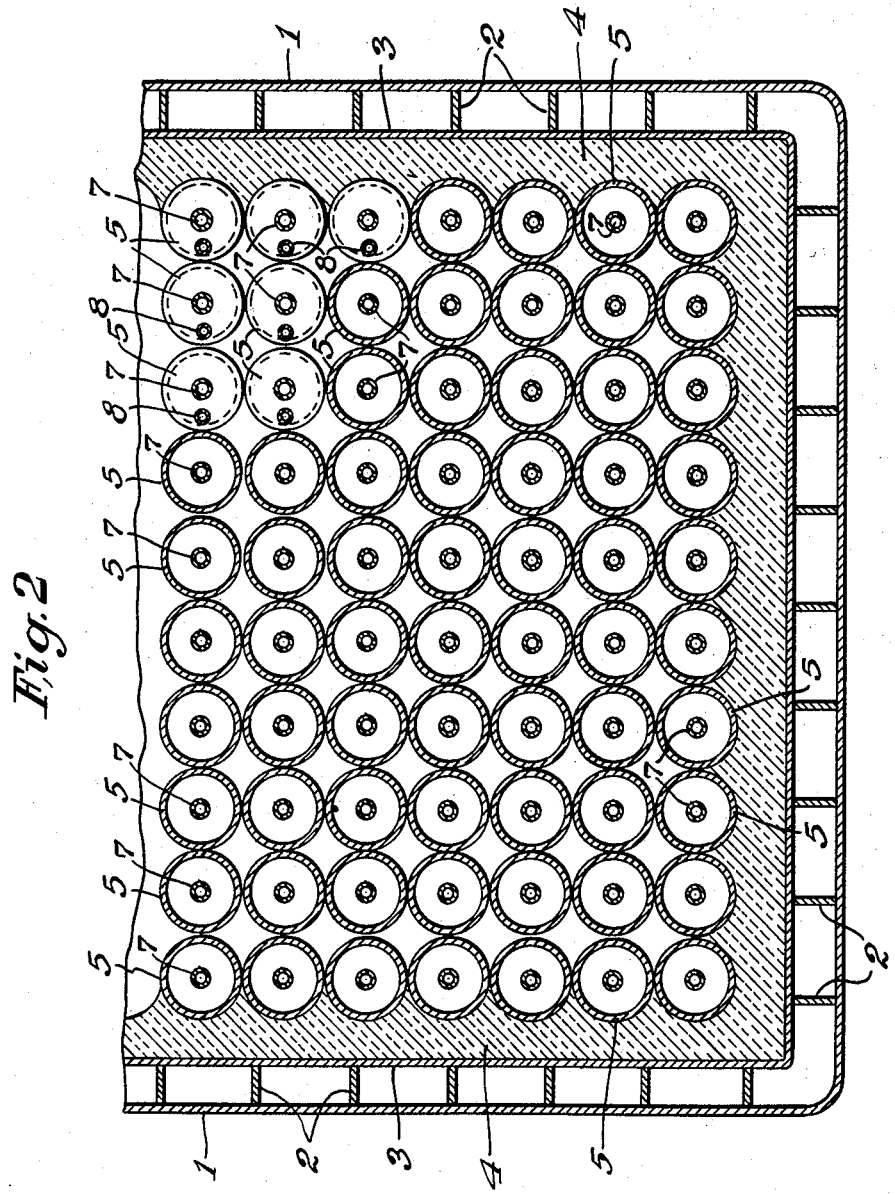

2,897,658

METHOD AND APPARATUS FOR UNLOADING COLD LOW TEMPERATURE BOILING LIQUIDS FROM STORAGE RESERVOIR

Sterling Beckwith, Lake Forest, Ill., assignor, by mesne assignments, to Constock Liquid Methane Corporation, a corporation of Delaware Application March 16, 1955, Serial No. 494,727

2 Claims. (Cl. 62—55)

My invention relates to means for storing and transporting cold, low temperature boiling liquids such as natural gas and methane. I propose to store and transport while being stored, liquid methane or other cold boiling gases at temperatures far below usual ambient temperatures and at approximately atmospheric pressure.

I propose to fill one or more tanks with the cold liquid and then transport it as a liquid from point or origin to point of use. While some of the gas may be evaporated from the liquid by ambient heat entering the mass through the insulated walls of the tank containing the liquid and may be used to furnish the fuel to generate the power to transmit the liquid, the major proportion of the liquefied gas will reach its destination as a liquid and then can be discharged into storage or used as a gas boiling off from the liquid in the transport tank or can be discharged as a liquid from the transport tank to a storage or treatment tank or may be discharged both as liquid and as gas.

In one exemplification of the present invention, the liquid will be containind in a multiplicity of relatively small liquid-tight tanks which are assembled in and insulated by an insulating chamber which contains them. The liquid may be supplied to these tanks through any suitable insulated conduit and the gas may be discharged from the tanks through any suitable duct or port and if the ambient heat alone is relied upon to vaporize the liquid and build up a sufficient pressure in the tank to cause outward flow at substantially atmospheric pressure of the vaporized gas, nothing further need be done except to allow the gas in gaseous phase to pass out to a point of storage or use. However, since it is contemplated that the liquefied gas will be transported for long distances under varying ambient temperature conditions, it is highly desirable to so insulate the liquid mass that but a limited amount of vaporization takes place so when the gas reaches its destination, additional unloading means will be required to discharge the gas from the storage and shipment tanks to storage or use on shore, assuming the tanks have been brought on a water-borne vessel.

The present invention involves the discharge of increased quantities of the liquid from transport to storage. I propose to use the gas boiled off from the liquid in the tank or tanks to build up a pressure in the tank which will be sufficient to expel the liquid from the tank at a suitable rate.

For example, a transport barge will tie up along side a dock or a storage barge. There is no longer a need for power to propel the barge so the gas discharge conduit will be closed. The liquid discharge conduit leading from the bottom of the tank to storage on the storage barge or on shore will be connected and the input of ambient heat to the tank will cause a continued boiling off of the liquid. The boiling of the gas greatly increases the volume of the gas over its liquid volume, so a pressure will rapidly be built up at the top of the tank and will force the liquid out through the conduit from the bottom of the tank for discharge and storage. If the boiling resulting from ambient heat is too rapid, dangerously high pressure might be generated in the tank. This is taken care of by opening the valve and allowing some of the gas to pass ashore through the gas discharge main. If, on the other hand, the rate of boiling is too slow, then gas can be pumped into the gas again to add to the pressure so as to get a sufficient discharge. Similarly, heat may be added to increase the rate of vaporization of the liquid. For example, hot water may be pumped between the shell and the hull. Warm gas may be forced back into the vessel to circulate about the tanks to increase the rate of vaporization of the liquid. Any suitable mechanism may be employed to warm the structure to increase the vaporization rate when the rate of boiling is too slow. The space between the hull and shell may be ventilated, when desired, and this will serve to affect the ability of the ambient heat to vaporize the liquid.

Other objects will appear from time to time throughout the specification and claims.

My invention is illustrated more or less diagrammatically in the accompanying drawings, wherein:

Figure 2 is a section along the line 2—2 of Figure 1.

Like parts are indicated by like characters throughout the specification and drawings.

Figure 1:
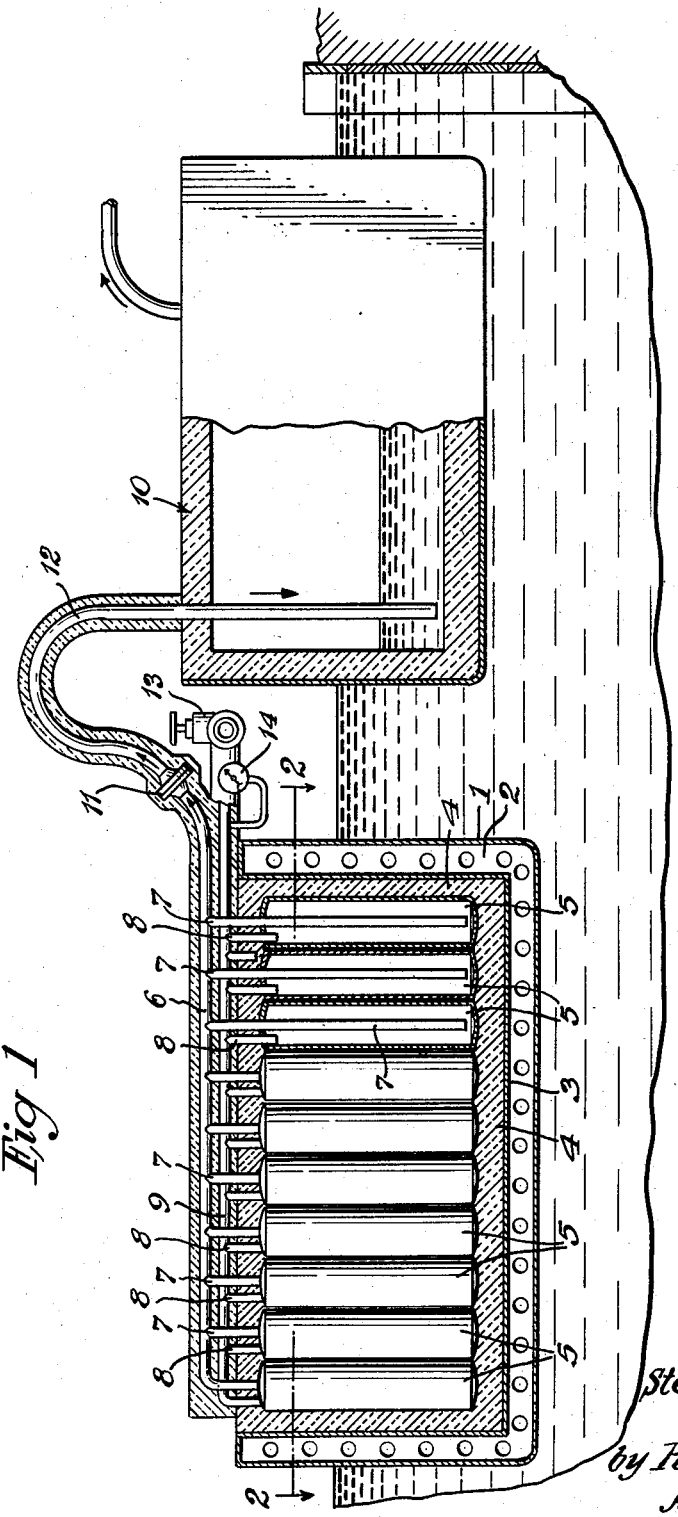
Figure 1 is a transverse section through a diagrammatic illustration of my apparatus.

1 is the outer skin of the hull of a waterborne vessel. 2 are the reinforcing structural frame members of the vessel. 3 is the inner skin supported by the frame members 2. 4 is an insulation lining the skin 3 and defining an insulated cold storage chamber which is in effect the hold of a ship. The hull may be coextensive with the vessel or there may be a plurality of such chambers or a single chamber of much less size than the hold of the vessel. The insulation 4 is preferably of balsa wood though other insulating material may be used.

Nested within the insulating chamber is a multiplicity of relatively small vertically disposed tanks 5. If they are round, there will be considerable clearance between the tanks in the chamber. If they are rectangular the clearance space between the tanks will be reduced. They may, if desired, be in contact with one another so that the metal of the tanks being a good heat conductor will permit heat flow and thus maintain a substantially uniform temperature throughout the entire insulating chamber. I have shown the tanks with convex top and bottom to interlock with the insulating chamber walls though any other suitable arrangement may be used so long as each tank is held in place in the insulating chamber by contact direct or indirect, as the case may be, with the insulating wall of the chamber so that relative movement between the tanks will not take place. The tanks may be tied together as a unit within the insulating chamber and out of contact with the outer skin or wall 3 of the insulating tank.

6 is an insulated pipe having branches 7 extending down toward the bottom of each tank 5. The cold boiling liquid may be introduced into the tanks through the pipes 6 and branches 7, the flow into individual tanks being controlled by any suitable flow control means not here illustrated since it forms no part of the present invention. 8 is a gas discharge pipe associated with each tank 5, communicating with a gas discharge pipe 9 so that the gas boiled off from the liquid may be discharged from the tanks and from the cold storage chamber. Each of the pipes 8 communicates not only with its associated tank and the gas discharge pipe 9 but also with the inside of the cold storage insulating chamber so that all tanks discharging gas, as they will, as a result of penetration of ambient heat, will be free to discharge into or to receive gas from the insulating chamber, thus making it impossible for differential pressures between the tanks and the chamber to occur.

Since the tanks will individually be of relatively small capacity and since the tanks are nested in the insulating chamber and supported by one another and by the chamber walls and since those tanks will be made of material which is not substantially weakened as a result of the cold, the cold boiling liquid will be kept out of contact with the insulating wall of the chamber. However, should there be any leakage or breakage of any of these tank walls, the worst that could happen would be a spreading of the liquid throughout the insulated area. The liquid would be at the same temperature in all the tanks so no change in that situation would prevail and since the insulation is continuous throughout the inner wall of the insulating chamber, the liquid will be kept away from the metal structural wall of the insulating chamber, will penetrate by hydrostatic pressure and capillary attraction, the pores of the insulation, such penetration being in capillary filaments and these capillary filaments will meet the ambient heat penetrating the insulation from the outer structural wall of the cold storage chamber, will vaporize the liquid to generate a gas pressure in the insulation sufficient to, if not expel the liquid from the insulation, at least prevent penetration as far as the metal of the cold storage wall or hold of the ship. Therefore, since the gas will not always be the temperature of the liquid and since its specific heat is much less than that of the liquid, the temperature of the outer structural wall of the cold storage chamber or hold of the ship will remain above the safety point.

Since each of the tanks is in communication with the interior of the chamber outside the tank, the chamber will always be filled with the gas boiled off from the liquid.

10 is an insulated chamber or storage tank. It is illustrated for example as another floating barge though it might be on shore. The pipe 6 is coupled at 11 to a pipe 12 which discharges at the bottom of the insulated tank 10, the pipe of course being insulated. As ambient heat enters through the insulation 4 to vaporize the cold boiling liquid in the tanks 5, a pressure is built up in the cold storage chamber and in each tank, depending upon the resistance to outflow of gas through the pipe 9 controlled by the valve 13. This control may be, if desired, automatic but can equally well be manual, depending upon the pressure indicator 14 which discloses to the operator the pressure within the system. This pressure applied to the surface of the liquid in each tank will cause the liquid to pass out through the branches 7 to the pipe 6 and thence through the pipe 12 for discharge at the bottom of the storage tank 10. Thus the liquid may be transferred from the vessel 1 to the storage tank 10 entirely as a result of pressure developed by vaporization of some of the liquid by ambient heat without any other vaporization of the liquid except that incident to its passing through the conduits from one tank to another and the liquid may be discharged as a liquid from transport to storage with a minimum amount of vaporization. If the rate of boiling or vaporization resultant from ambient heat is not sufficient to generate a pressure which will discharge the liquid at the desired rate, all that is necessary is to reverse the flow of gas from the system by any suitable pump to increase the pressure available in the tank 5 upon the surface of the liquid to a point above that which would normally result from vaporization or boiling only.

I claim:

1. The method of transporting liquefied methane in large volumes at about atmospheric pressure from one point to another remote point and transferring the liquefied methane into a receiver at the remote point for storage and distribution comprising the steps of introducing the cold liquefied methane into an insulated container of large capacity on a conveying means for storage therein at about atmospheric pressure, said container being such that heat in sufficient amount is transferred through the insulated walls of the container into the cold liquefied methane continuously to vaporize a small portion of the liquefied methane contained therein, discharging vaporized methane from the container during transportation to maintain the pressure within the container at about ambient pressures, and preventing the discharge of the vaporized methane from the container when at the remote point to cause the build-up of pressures within the container sufficient to cause the displacement of the liquefied gas from the transport container to the storage container, the amount of heat transmission through the insulated container being such as to facilitate the maintenance of pressure conditions for continuous transfer, the container having a dip tube extending to the bottom portion thereof through which the liquefied methane is displaced in response to the build-up of pressure within the container.

2. The method of claim 1 characterized further in that the gaseous methane which is discharged during transit is utilized to perform the useful work.

References Cited in the file of this patent

UNITED STATES PATENTS

| 2,040,059 | Mesinger | May 5, 1936 |
| 2,550,886 | Thompson | May 1, 1951 |
| 2,565,156 | Wexler | Aug. 21, 1951 |
| 2,567,588 | Zenner et al. | Sept. 11, 1951 |
| 2,580,649 | Bludeau | Jan. 1, 1952 |
| 2,670,605 | Van Zandt et al. | Mar. 2, 1954 |